(12) United States Patent
Bertoni et al.

(10) Patent No.: US 11,994,588 B2
(45) Date of Patent: May 28, 2024

(54) THREE-DIMENSIONAL SURFACE SCANNING

(71) Applicant: VI3D LABS INC., Victoria (CA)

(72) Inventors: Christopher Adam Bertoni, Victoria (CA); Francis Kent Dickie, Nanaimo (CA); Ivan Pakhotin, Edmonton (CA)

( * ) Notice: Subject to any disclaimer, the term of this patent is extended or adjusted under 35 U.S.C. 154(b) by 827 days.

(21) Appl. No.: 15/733,871

(22) PCT Filed: May 29, 2019

(86) PCT No.: PCT/CA2019/050730
§ 371 (c)(1),
(2) Date: Nov. 30, 2020

(87) PCT Pub. No.: WO2019/227212
PCT Pub. Date: Dec. 5, 2019

(65) Prior Publication Data
US 2021/0223397 A1    Jul. 22, 2021

Related U.S. Application Data

(60) Provisional application No. 62/677,914, filed on May 30, 2018.

(51) Int. Cl.
*G01S 17/89* (2020.01)
*G01B 11/25* (2006.01)
*G01S 17/86* (2020.01)

(52) U.S. Cl.
CPC .......... *G01S 17/89* (2013.01); *G01B 11/2518* (2013.01); *G01S 17/86* (2020.01)

(58) Field of Classification Search
None
See application file for complete search history.

(56) References Cited

U.S. PATENT DOCUMENTS 6,064,942 A * 5/2000 Johnson ............... G01C 21/005
434/1
9,870,624 B1    1/2018 Narang et al.
(Continued)

FOREIGN PATENT DOCUMENTS

CN    105136058    12/2015
GB    2328280 A    2/1999
(Continued)

OTHER PUBLICATIONS

Search report and written opinion for related Singapore Application No. 11202011825T, dated Jul. 5, 2022, pp. 1-9.
(Continued)

*Primary Examiner* — Eric L Bolda
(74) *Attorney, Agent, or Firm* — Notio Law Group, LLC

(57) ABSTRACT

A three-dimensional scan of an object may be performed by a three-dimensional scanning device to obtain a three-dimensional representation of the object. A coherent beam of light is emitted towards and reflected by the object with the reflected light being measured to form a set of light measurements at each of a plurality of data acquisition points. A sensor array in the device tracks and measures movement of the device and a linear displacement with respect to a fixed anchor point that is external to the device. The tracked movement of the device and the reflected light measurements are synchronized according to when they were measured with this synchronized data being used to generate a three-dimensional representation of the object.

38 Claims, 3 Drawing Sheets

(56) References Cited

U.S. PATENT DOCUMENTS

2008/0201101 A1  8/2008 Hebert et al.
2009/0323121 A1  12/2009 Valkenburg et al.

FOREIGN PATENT DOCUMENTS

WO  2017155970    9/2017
WO  2017155970 A1  9/2017

OTHER PUBLICATIONS

He Ying et al., "An Iterative Closest Points Algorithm for Registration of 3D Laser Scanner Point Clouds with Geometric Features", Sensors 2017, 17(8), 1862, p. 1-16, Aug. 11, 2017, available at: www.mdpi.com/journal/sensors.
Roetenberg et al., "Ambulatory Position and Orientation Tracking Fusing Magnetic and Inertial Sensing", IEEE Transactions on Biomedical Engineering, vol. 54, No. 5, p. 883-890, May 2007.
Zhao et al., "Motion Measurement Using Inertial Sensors, Ultrasonic Sensors, and Magnetometers with Extended Kalman Filter for Data Fusion", IEEE Sensors Journal, vol. 12, No. 5, p. 943-953, May 2012.
International Search Report and Written Opinion received for International Application No. PCT/CA2019/050730 mailed on Jul. 23, 2019, 9 pages.
Supplemental Search Report for related application EP 19 81 1803, dated Feb. 15, 2022.

\* cited by examiner

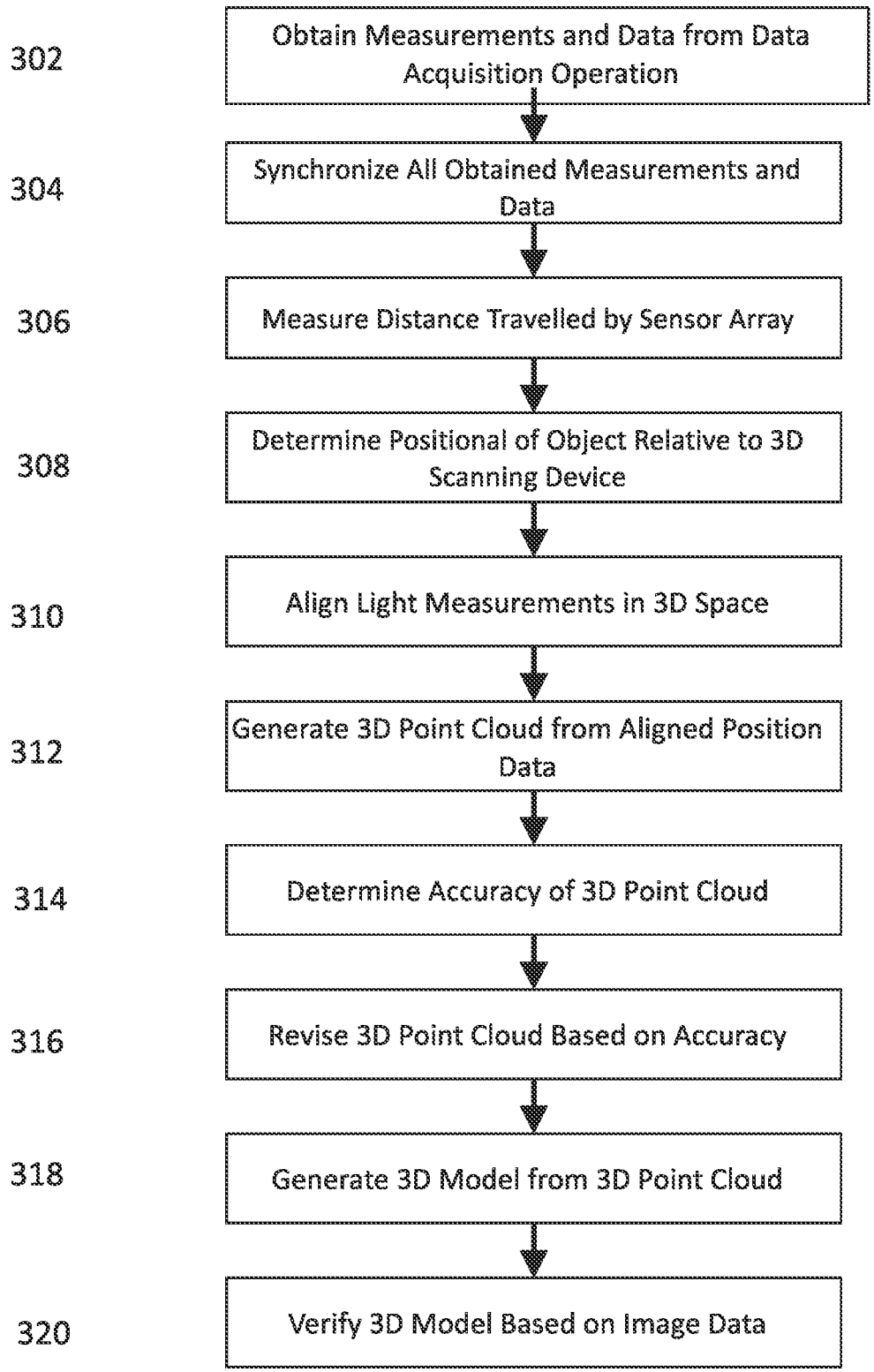

THREE-DIMENSIONAL SURFACE SCANNING

FIELD

The present techniques relate to surface scanning of objects in three-dimensional space.

BACKGROUND

This section is intended to introduce various aspects of the art, which may be associated with exemplary embodiments of the present techniques. This discussion is believed to assist in providing a framework to facilitate better understanding of particular aspects of the present techniques. Accordingly, it should be understood that this section should be read in this light, and not necessarily as admissions of prior art.

Various techniques exist for scanning an object in three-dimensions to create a three-dimensional representation of the object. Many of these techniques are either labor intensive or rely on large, often stationary, systems. Systems using these techniques may rely on a fixed pivoting arm attached to a measurement device or separate fixed camera based units to determine a position and orientation of a measurement device with respect to object being scanned. Further, many of these techniques may produce three-dimensional models of an object but these resulting three-dimensional models may lack sufficient accuracy for use in many commercial or industrial applications.

An object may be scanned in three-dimensions for a number of purposes including creating a three-dimensional model therefrom that may be used, for example, for purposes of quality control inspections, dimensional conformance, and detection of anomalies in components both post manufacturing and also in situ. However, a three-dimensional model to be used in an industrial application requires high accuracy (e.g., ideally accurate within millimeters or sub-millimeters) but obtaining such an accurate three-dimensional model can be a complicated process requiring large contact inspection systems or the like.

Inspection systems used in industrial installations for regular in situ inspection of components form complex integrated systems within the industrial installation. However, these components may be positioned in largely inaccessible locations, hampering regular inspection, which may not enable visible detection of anomalies. Further, visual inspections do not provide accurate three-dimensional measurements of any detected anomalies on the components. Where systems are constructed to perform visual inspections, these systems are generally large, stationary machines that may have limited applications due to their size, thus restricting in situ inspections using these systems.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An embodiment provides a three-dimensional scanning device comprising: a light source configured to produce a coherent beam of light that is emitted towards an object, the coherent beam of light being reflected by the object; a light receiving sensor configured to receive and measure the reflected coherent beam of light reflected by the object, the received reflected coherent beam of light forming at set of light measurements; a sensor array configured to track movement of the three-dimensional scanning device in three-dimensional space in real-time, the sensor array measuring movement of the three-dimensional scanning device and a linear displacement with respect to a fixed anchor point that is external to the three-dimensional scanning device; a memory in which data representing the set of light measurements from the light receiving sensor and data representing measurements of the movement and the linear displacement of the three-dimensional scanning device from the sensor array are stored; and a processor configured to: measure, at the sensor array, the movement and the linear displacement of the three-dimensional scanning device during the movement of the three-dimensional scanning device to provide the data representing the movement and the linear displacement of the three-dimensional scanning device; measure, at the light receiving sensor at a plurality of data acquisition points, the received reflected coherent beam of light reflected by the object to produce the data representing the set of light measurements at each of the plurality of data acquisition points, the plurality of data acquisition points occurring during the movement of the three-dimensional scanning device; synchronize, from the memory at the plurality of data acquisition points, the data representing the movement and linear displacement of the three-dimensional scanning device with the data representing the set of light measurements to generate a synchronized data set for each of the plurality of data acquisition points; and generate a three-dimensional representation of the object based on the synchronized data set for the plurality of data acquisition points.

An embodiment provides a three-dimensional scanning system comprising: a three-dimensional scanning device comprising: a light source configured to produce a coherent beam of light that is emitted towards an object, the coherent beam of light being reflected by the object; a light receiving sensor configured to receive and measure the reflected coherent beam of light reflected by the object, the received reflected coherent beam of light forming at set of light measurements; a sensor array configured to track movement of the three-dimensional scanning device in three-dimensional space in real-time, the sensor array measuring movement of the three-dimensional scanning device and a linear displacement with respect to a fixed anchor point that is external to the three-dimensional scanning device; a transmission unit for transmitting data representing the set of light measurements from the light receiving sensor for each of a plurality of data acquisition points occurring during the movement of the three-dimensional scanning device and data representing measurements of the movement and the linear displacement of the three-dimensional scanning device from the sensor array; and a computer comprising: an interface for receiving the data representing the set of light measurements for each of the plurality of data acquisition points from the light receiving sensor and the data representing measurements of the movement and the linear displacement of the three-dimensional scanning device from the sensor array; a processor configured to: determine a position and orientation of the three-dimensional scanning device at each of the plurality of data acquisition points based on the measured movement and the linear displacement; determine an initial position and orientation of the object based on the set of light measurements at a first of the plurality of data acquisition points; determine a position and orientation of the object for each subsequent one of the plurality of data acquisition points based on a difference between the set of light measurements from a previous consecutive one of the plurality of data acquisition points and between the set of light measurements at the subsequent one of the plurality of data acquisition points; and generate a three-dimensional representation of the object based on the position and orientation of the three-dimensional scanning device and the position and orientation of the object at the plurality of data acquisition points.

An embodiment provides a method of performing a three-dimensional scan of an object comprising: emitting a coherent beam of light from a three-dimensional scanning device to the object, the coherent beam of light being reflected by the object; measuring the reflected coherent beam of light at the three-dimensional scanning device to form a set of light measurements; obtaining an initial position and orientation of the object with respect to a three-dimensional scanning device based on a set of light measurements at a first of a plurality of data acquisition points; measuring movement of the three-dimensional scanning device by tracking three-dimensional movement and linear displacement with respect to a fixed anchor point that is external to the three-dimensional scanning device; measuring the reflected coherent beam of light at the three-dimensional scanning device at the plurality of data acquisition points to obtain a set of light measurements at each of the plurality of data acquisition points, the plurality of data acquisition points occurring during the movement of the three-dimensional scanning device; determining a position and orientation of the three-dimensional scanning device at each of the plurality of data acquisition points based on the measured movement and the linear displacement; determining an initial position and orientation of the object based on the set of light measurements at a first of the plurality of data acquisition points; determining a position and orientation of the object for each subsequent one of the plurality of data acquisition points based on a difference between the set of light measurements from a previous consecutive one of the plurality of data acquisition points and between the set of light measurements at the subsequent one of the plurality of data acquisition points; and generating a three-dimensional representation of the object based on the position and orientation of the three-dimensional scanning device and the position and orientation of the object at the plurality of data acquisition points.

In addition to the exemplary aspects and embodiments described above, further aspects and embodiments will become apparent by reference to the drawings and by study of the following detailed descriptions.

BRIEF DESCRIPTION OF THE DRAWINGS

The advantages of the present techniques will be better understood by referring to the following detailed description and the attached drawings. It is intended that the embodiments and figures disclosed herein are to be considered illustrative rather than restrictive.

FIG. 3 illustrates a flow chart of a three-dimensional model creation operation according to an embodiment based on results of the data acquisition operation.

DETAILED DESCRIPTION

Figure 1:
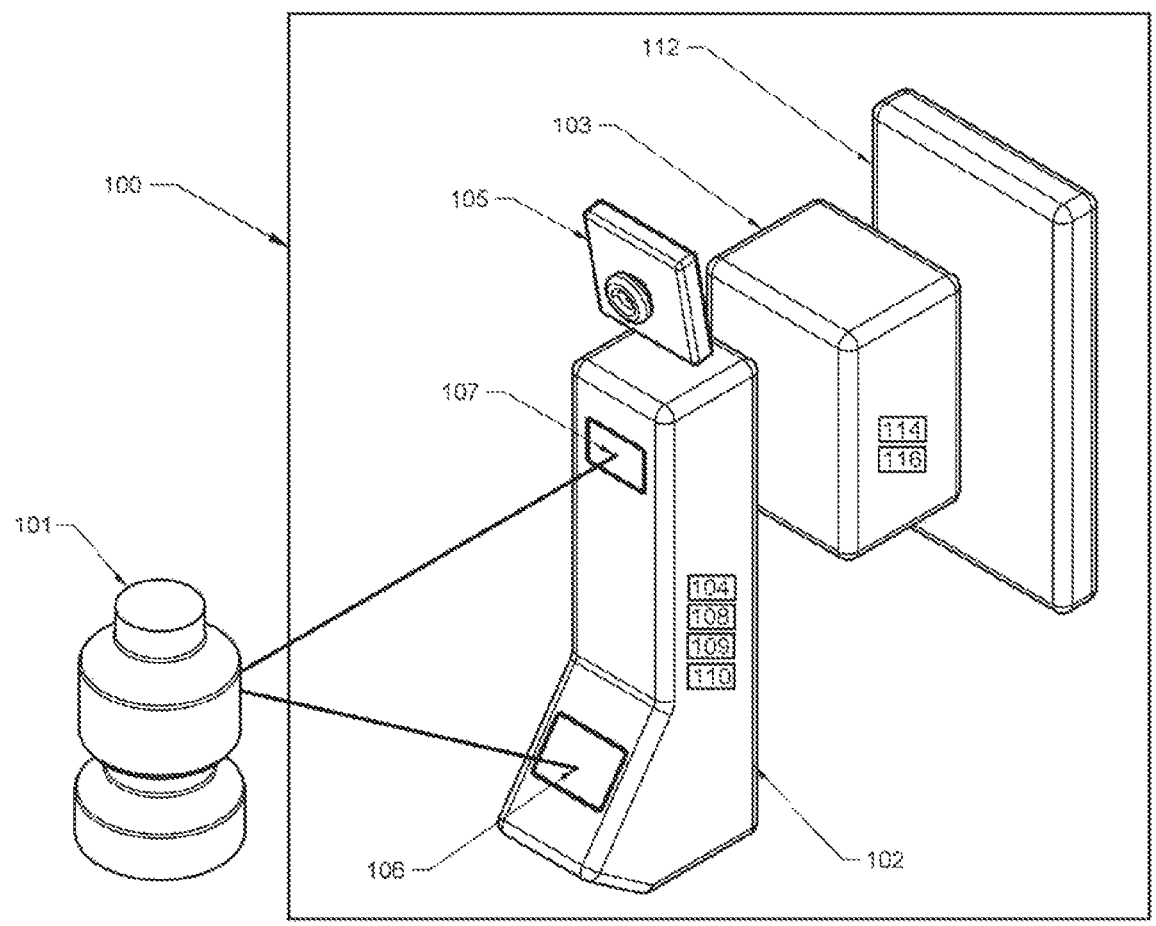
FIG. 1 illustrates a three-dimensional scanning device according to an embodiment.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to specific embodiments described below but rather, include all alternatives, modifications, and equivalents.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments and terms or techniques that serve the same or a similar purpose are considered to be within the scope hereof.

As used herein, three-dimensional and three-dimensional space refers to a three-dimensional coordinate system in which a set of ordered coordinates is used (e.g., Cartesian coordinates comprising x-coordinate, y-coordinate, and z-coordinate). Each coordinate may respectively represent a location in three-dimensional space relative on an origin. Three-dimensional space may be any space that is defined by any three-dimensional coordinate system.

As used herein, handheld in respect of devices refers to a device that does not require any external mechanical structure for support or movement of the device. A handheld device is sufficient in dimensions and weight to be able to be held by a user during operation thereof. However, the fact that a device is handheld does not preclude it from being used in correspondence with a frame or other external support in certain circumstances.

As used herein, accurate and accuracy are dependent upon the accuracy of components within a device and the algorithms used in the processing of the acquired data. For example, in a three-dimensional scanning device that is disclosed, accuracy of the three-dimensional scanning device may be dependent upon accuracy of any sensors used in the three-dimensional scanning device. For example, a three-dimensional scanning device may be accurate to approximately 0.01 millimeters (mm) along an x-axis, approximately 0.001 mm along a z-axis and orientation and location data may be accurate to approximately +/−0.3 degrees. Additionally, accuracy in respect of overall data acquisition may also be dependent upon a number of data acquisition points as well as a relative spacing of the data acquisition points with respect to at least one of space and time. For example, accuracy of any data resulting from a data acquisition operation may increase with an increase in movement of the three-dimensional scanner in a short period of time as this may reduce an effect of positional drift.

As used herein, 3-dimensional representation is any representation of an object in 3-dimensional space. A 3-dimensional representation may include, but is not limited to a 3-dimensional point cloud, a 3-dimensional wire mesh, a 3-dimensional model, etc.

Overview

A device is disclosed that can obtain accurate three-dimensional measurements of a surface of an object such that these three-dimensional measurements can be used to construct a three-dimensional representation of the surface of the object.

A three-dimensional scanning device uses a light-based measuring device (such as a laser and a receiving sensor) and a camera to accurately measure a distance of an object's surface features relative to the three-dimensional scanning device. These measurements are collected and stored with measurements representing a position and orientation of the three-dimensional scanning device from a sensor array on the three-dimensional scanning device. All of these measurements in combination are used to construct a three-dimensional representation of the object. This three-dimensional representation may be sufficiently accurate that the three-dimensional representation can be used for comparison to design criteria post manufacturing or in situ to confirm conformance to engineering requirements and tolerances. This three-dimensional representation of the object can also be used to generate a three-dimensional model of the object.

The three-dimensional scanning device may operate as a floating system in that it does not require a fixed arm or attachment to a base or other fixed work area providing a stationary reference location. The three-dimensional scanning device may use a stationary anchor point (e.g., a fixed location in a room such as a wall, floor, ceiling, etc.) for additional accuracy during initialization or at other points during a data acquisition operation. However, it is within the scope to use the three-dimensional scanning device within a fixed frame or other external support system for additional accuracy, better positioning, etc.

The three-dimensional scanning device may perform a data acquisition operation of scanning the surface of an object at a high frequency with highly accurate sub-millimeter light-based measurements of the object. Multiple instances of data acquisition through measurements of the object are tracked through movement of the three-dimensional scanning device via a sensor array as the three-dimensional scanning device moves from one location (or data acquisition point) to another location (or data acquisition point). The measurements from each of the data acquisition points are synchronized with each other with regards to collection time to provide a three-dimensional representation of the object which may be used to identify areas of interest as well as to visualize and obtain measurements of these areas on the object.

Exemplary Embodiments

FIG. 1 illustrates a three-dimensional (3D) scanning device 100 according to an embodiment. The 3D scanning device 100 may be used to scan the surface of an object 101, generally a stationary and static object, during a data acquisition operation to obtain a plurality of measurements at a plurality of data acquisition points. While the configuration of the 3D scanning device 100 is disclosed as a handheld device, the 3D scanning device 100 may also be used to augment a free-running or remotely operated tool system, such as, for example, a robotic arm, a remote crawler, remote inspection tools, etc.

The 3D scanning device 100 includes a body 102 containing a light source 107, a light receiving sensor 106 and a camera 105. The body 102 may contain a control processor 110, a processor 104, a memory 108, a transmission unit 109 and a sensor array 103 for measuring a position and orientation of the 3D scanning device 100 during the data acquisition operation. The 3D scanning device 100 may also include a display 112 that may be used to communicate information to a user regarding operations of the 3D scanning device 100. The display 112 may be a touch screen to allow for input from a user. If the display 112 is not a touch screen or if additional mechanisms of user input are desired then alternate or additional user input devices may be provided on the 3D scanning device 100, such as, for example, buttons, a tracking device, etc. A user interface may be formed from the display 112 along with any additional user input devices present in the 3D scanning device 100 (not shown in FIG. 1).

The light source 107 produces a coherent beam of light that is emitted towards the object 101, reflected by the object 101 and then received by the light receiving sensor 106 in a manner that enables the light receiving sensor 106 to use the reflected light to determine a distance from the light receiving sensor 106 to the object 101. The light source 107 emits a coherent beam of light that can be received by the light receiving sensor 106 in a manner so as not to be impacted by ambient light. The light source 107 may be a diode that emits a coherent beam of light in a pattern. For example, the light source 107 may be, for example, a laser or a light emitting diode (LED) that emits a coherent beam of light in a such a manner that a dot pattern, a line scan or a point is produced. The light source 107 may also emit light that moves in a pattern.

A frequency of the light source 107 may be determined by a range of ambient light frequency and amplitude of light in a surrounding environment in which the 3D scanning device 100 is used. For example, the light source 107 may be selected to emit light at a frequency that is outside a range of ambient light in a work environment in which the 3D scanning device 100 is to be used. An assessment of the ambient light in the work environment may be performed to determine appropriate specifications for the light source 107 to ensure that the light source 107 falls outside of and reception thereof is not interfered by the ambient light. As an example, the light source 107 may be a laser in a visual range wavelength (400 nanometers (nm) to 700 nm) or an infrared range wavelength (800 nm to 1400 nm).

The light source 107 and the light receiving sensor 106 function cooperatively such that the light source 107 generates and emits a light which is reflected by the object 101. The reflected light is received by the light receiving sensor 106. The light receiving sensor 106 may be selected to receive light corresponding to the specifications of the light emitted by the light source 107.

Various techniques, including but not limited to e.g. laser triangulation, may be used to extrapolate a distance measurement between the object 101 and the 3D scanning device 100 as a result of the receipt of the reflected light by the light receiving sensor 106. Such extrapolation may be performed by the light receiving sensor 106, the processor 104 or a processing device that is external to the 3D scanning device 100.

During the data acquisition operation, the light source 107 will emit light and the light receiving sensor 106 will receive reflected light at each of the plurality of data acquisition points. Each of the plurality of data acquisition points may occur when the 3D scanning device 100 is at different physical positions and orientations around the object 101. At each of these plurality of data acquisition points, the light source 107 may emit one or more coherent beams of light towards the object 101. In the case where the light source 107 only emits a single light beam towards the object 101, that single light beam may move in a pattern or be emitted as a line scan. In the case where the light source 107 emits multiple light beams towards the object 101, the multiple light beams may be organized in a pattern, such as, for example, a dot pattern.

The light receiving sensor 106 may receive multiple measurements resulting in specific point measurements of features of the object's surface for each of the plurality of data acquisition points during the data acquisition operation. These multiple measurements at the light receiving sensor 106 form a data set of measurements for each of the plurality of data acquisition points. Thus, a plurality of sets of received light measurements has been obtained at the completion of the data acquisition operation. Each of the plurality of sets of received light measurements corresponds to one of the plurality of data acquisition points and each of the plurality of sets of received light measurements contains one or more received light measurements from that data acquisition point. For example, the light receiving sensor 106 may be a sensor capable of receiving and detecting approximately 1000-1500 points per profile resolution with a field of view range from 20 mm to 1200 mm and a measurement range of 10 mm to 1500 mm, x resolution of 0.01 mm to 0.3 mm, z resolution of 0.001 mm to 0.09 mm, profile sampling to 100 profiles/second to 10000 profiles/second and operating temperature range of –20 C to 50 C. Field of view ranges may be determined by a size and geometry of the light receiving sensor 106. The light source 107 may emit, for example, 1000-1500 different points of light at a given data acquisition point of the 3D scanning device 100 during a data acquisition operation. Each of these points of light may be, for example, 0.001 mm (millimeters) apart from each other. The light receiving sensor 106 receives each of these points and identifies the distance between the object 101 and the 3D scanning device 100 for each of these points of light.

The camera 105 collects images of the object 101. These images provide an indication of surfaces and features of the object 101 along with surface colours and textures. The camera 105 may obtain still images and/or video images of the object 101 during the data acquisition operation at each data acquisition point or only at a subset of the plurality of data acquisition points. For example, the camera 105 may be configured to provide manual and automatic shutter control as well as control of contrast and brightness. The camera may be, for example, a line scan camera or a charge-coupled device (CCD) camera. In certain working environments, a line scan camera may provide increased accuracy where there is limited control over the working environment and in specific ambient light conditions this may be beneficial.

The sensor array 103 tracks motion of the 3D scanning device 100 in 3D space. Motion of the 3D scanning device 100 during the data acquisition operation is tracked by the sensor array 103 to provide relationships between received light measurement at the light receiving sensor 106 and a position and orientation of the 3D scanning device 100 resulting in a position and orientation of the object 101 at any particular data acquisition point during the data acquisition operation.

The position and orientation of the 3D scanning device 100 is tracked in three-dimensional space by the sensor array 103 over a time of the data acquisition operation. A distance travelled by the 3D scanning device 100 during the data acquisition operation is measured by the sensor array 103 in real time or the position and orientation of the 3D scanning device 100 may be obtained at each data acquisition point. An initial orientation and positional state of the 3D scanning device 100 is measured and all subsequent movement and motions are tracked throughout the data acquisition operation. If the sensor array 103 continuously tracks movement of the 3D scanning device 100 during the data acquisition operation then individual measurements may need to be extrapolated to determine the position and orientation of the 3D scanning device 100 at each of the plurality of data acquisition points.

The sensor array 103 may determine linear distances, axis velocities, linear accelerations, orientation and acceleration vector data of the 3D scanning device 100 during the data acquisition operation. For example, the sensor array 103 may track movement of the 3D scanning device in 3D space as well as linear displacement with respect to a fixed anchor point that is external to the 3D scanning device 100 (e.g., a fixed anchor point on a floor, a wall or ceiling in the environment in which the object 101 is being scanned).

The sensor array 103 may comprise any component capable of accurately tracking the position and orientation of the 3D scanning device 100 in 3D space without requiring an external or stationary frame of reference. It is preferred, but not essential, that such the sensor array 103 not require any external measurements or components, although such a configuration may be within the scope. The sensor array 103 may include multiple components for providing measurements for position and orientation of the 3D scanning device 100, for example, it may include a combination of one or more of an inertial measuring unit, a linear distance measuring sensor (e.g., an infrared optical time of flight sensor, a sonar sensor, etc.), a linear accelerometer, a gyroscope (e.g., microelectromechanical systems gyroscope), a magnetometer, a distance measuring device having high accuracy (e.g., accurate to between +/–0.01 mm and +/–1.0 mm), a Global Positioning System module (GPS) possibly with Real Time Kinematics or other accuracy improvement mechanisms, a Global Navigation Satellite System (GNSS) module possibly with Real Time Kinematics or other accuracy improvement mechanisms, etc.

In one configuration, the sensor array 103 may comprise an inertial measuring unit 114 having multiple components for measuring acceleration in multiple axes and rotational rate as well as at least one linear distance measuring sensor 116 for measuring a linear distance with respect to a fixed anchor point that is external to the 3D scanning device 100. In this exemplary embodiment, the sensor array 103 may include a 9 degree of freedom inertial measuring unit 114 having a position and orientation measurement accuracy of +/–0.3 degrees.

When an inertial measuring unit 114 forms at least part of the sensor array 103, the inertial measuring unit 114 tracks movement of the 3D scanning device via accelerometer(s) providing measurements of acceleration. Displacement of the 3D scanning device 100 may be obtained by double integration of the accelerometer measurements. However, as a result of this double integration, any errors in the accelerometer measurements will accumulate in time resulting in a drift in the displacement measurements obtained in this manner. Some components of the error are deterministic and can be calibrated to be removed; however, there are components of the error that are the result of random noise or non-deterministic biases that cannot be easily removed.

In the above exemplary embodiment in which the sensor array 103 includes an inertial measuring unit 114, the use of one or more linear distance measuring sensors 116 with the inertial measuring unit 114 may improve accuracy of the measurements from the inertial measuring unit 114 by providing a distance travelled by the 3D scanning device 100 with respect to a fixed anchor point in the environment during the data acquisition operation. The distance travelled as measured by the linear distance measuring sensor 116 can be used to check displacement at regular intervals to correct for any accumulated error as a result of the above determination of displacement from the accelerometer measurements from the inertial measuring unit 114, as will be further discussed below. The linear distance measuring sensor 116 measures the distance from the 3D scanning device 100 to a fixed anchor point within the environment. The linear distance measuring sensor 116 may be one or more sensors located around the 3D scanning device 100 to determine the distance to a fixed anchor point or multiple fixed anchor points according to a configuration of the linear distance measuring sensor(s) 116 and the environment in which the scanning is taking place. An error check may be performed in two axes by observing and matching features on the surface of the object 101 between consecutive sets of received light measurements with an error check in the third axis being supplied by the linear distance provided by the linear distance measuring sensor 116, as will be further discussed below. A separate measurement is supplied by the linear distance measuring sensor 116 to verify how far the 3D scanning device 100 has moved between each data acquisition point. The linear distance measuring sensor 116 provides this measurement to enable determination of the drift, which can then be corrected in all three dimensions.

In the above exemplary embodiment, the linear distance measuring sensor 116 may measure a linear distance to a fixed anchor point on an external surface such as a wall or floor, when those surfaces are available. For accuracy, the linear distance measuring sensor 116 may measure such distance to an accuracy of, for example, 1.0 mm with a frequency of 100 Hz (or some other frequency that corresponds with the frequency at which the other components of the sensor array 103 are obtaining measurements).

FIG. 1 illustrates an embodiment in which the sensor array 103 is composed of the inertial measuring unit 114 and the linear distance measuring 116; however, the sensor array 103 is not limited to this configuration of sensors and may include any number of the above mentioned sensors as is appropriate to accurately determine the position and orientation of the 3D scanning device 100 in 3D space.

The camera 105, the sensor array 103 and the light source 107 with the light receiving sensor 106 are activated by the control processor 110 to obtain and collect their respective measurements and data at each of the plurality of data acquisition points during the data acquisition operation. The camera 105, the sensor array 103 and the light source 107 with the light receiving sensor 106 may be activated at the same time by the control processor 110 to collect measurements and data in a burst mode collection such that the measurements and data are collected either at regular intervals or upon a measurement activation request from a user of the 3D scanning device 100. Alternatively, the camera 105, the sensor array 103 and the light source 107 with the light receiving sensor 106 may operate in a continuous mode once activated and until a stop command is issued.

The control processor 110 and the processor 104 may be formed in the same unit or may be provided as separate components within the 3D scanning device 100. The control processor 110 controls the elements of the 3D scanning device 100 during the data acquisition operation so that these elements operate in a cooperative manner. The processor 104 is responsible for processing the measurements and data from the elements of the 3D scanning device 100 for purposes of storing, transmitting and performing post processing on this data.

While FIG. 1 illustrates the 3D scanning device 100 as containing a processor 104, a memory 108 and a transmission unit 109, these elements may or may not be present depending on the functioning of the 3D scanning device 100. For example, the 3D scanning device 100 may be a stand alone unit containing the display 112 in which all measurements are obtained within the 3D scanning device 100 and all processing contained within the 3D scanning device 100 with the display 112 being used to convey results of the data acquisition operation to a user. In such a configuration any measurements obtained by the 3D scanning device 100 may be stored within the memory 108 and processed by the processor 104 to derive a 3D representation of a surface of the object 101 being scanned. In this configuration the transmission unit 109 may or may not be present to later convey any of the measurements or the 3D representation.

In an alternate configuration, the 3D scanning device 100 may obtain only raw measurement data from the camera 105, the sensor array 103 and the light source 107 with the light receiving sensor 106. This raw measurement data may be sent either immediately through the transmission unit 109 to an external computer or may be sent in batches to the external computer. In such a configuration the 3D scanning device 100 might not perform any processing of the measurements and these measurements may or may not be stored in the memory 108.

The 3D scanning device 100 may also have a configuration falling within a range of the spectrum of performing no processing to performing all or nearly all processing within the 3D scanning device 100. Likewise, the 3D scanning device 100 may fall anywhere within a range of transmitting all measurements to an external computer immediately upon measuring or transmitting only limited data such as the 3D representation of the object after generation of this data.

The transmission unit 109 may be configured to transmit data from the 3D scanning device 100 through the use of wireless technologies such as Bluetooth™, WiFi™, cellular technologies or any other wireless means of transmission. The transmission unit 109 may also use a wired means of communication connected to an external computer. The sensor array 103 may be configured to incorporate the transmission unit 109 such that the inertial measuring unit 109 may communicate data in a closed off environment with no access to outside communications such as cellular or satellite links such as through WiFi™ or Bluetooth™ communications.

While the 3D scanning device 100 is described as functioning based on commands from a user in possession of the 3D scanning device 100, there may also be configurations in which control of the 3D scanning device 100 is performed by an external computer. In such a configuration, commands to perform initial operations and the data acquisition operation may originate from the external computer and may be transmitted to the 3D scanning device 100 through the transmission unit 109. A state of operation of the 3D scanning device 100 along with measurements obtained as a result of these control commands may be sent to the external computer through the transmission unit 109.

Figure 2:
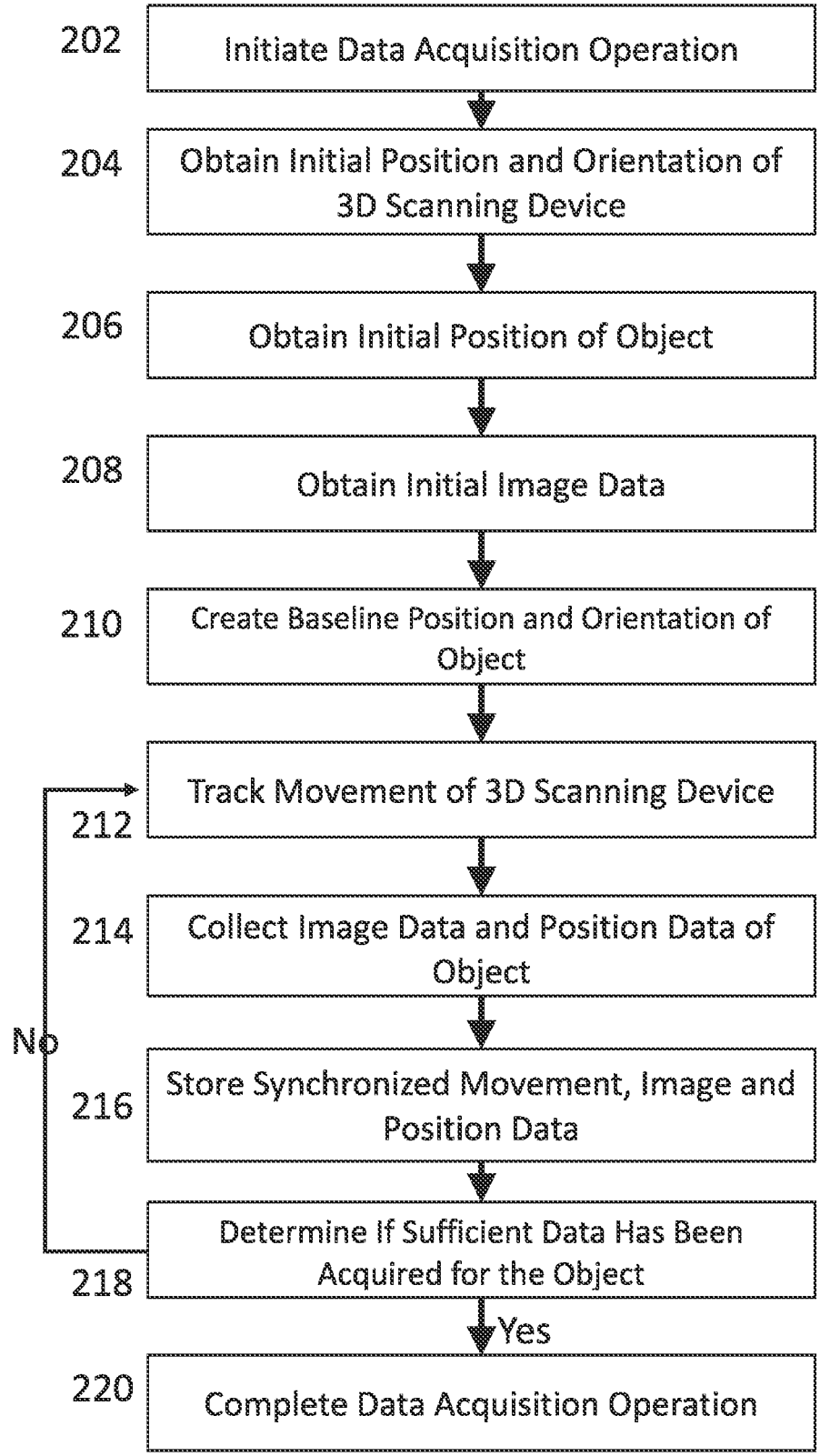
FIG. 2 illustrates a flow chart of a data acquisition operation according to an embodiment using the three-dimensional scanning device.

FIG. 2 illustrates a data acquisition operation 200 by the 3D scanning device 100 in which the 3D scanning device 100 may be moved over and around the object 101 in sweeping passes to obtain measurement data about the object 101. The data acquisition operation 200 occurs in the 3D scanning device 100 under the control of the control processor 110 and the processor 104 either with or without input from an external computer through the transmission unit 109.

The data acquisition operation 200 is initiated in step 202. The 3D scanning device 100 may be activated by a user by some mechanism such as, for example, using a touch screen, push of a button, etc. The data acquisition operation 200 may be paused at any point using a similar mechanism.

An initial position and orientation of the 3D scanning device 100 is obtained from the sensor array 103 in step 204. The initial position and orientation of the 3D scanning device 100 is obtained in 3D space and may be determined according to a floating coordinate system that is anchored in the 3D scanning device 100 such that the initial position and orientation of the 3D scanning device 100 need not be determined relative to any other object or space. This initial position and orientation can be used to form a baseline measurement for position and orientation of the 3D scanning device 100 as it is moved during the data acquisition operation 200. The sensor array 103 obtains measurements for the movement of the 3D scanning device 100 and a linear displacement with respect to a fixed anchor point in the environment. The sensor array 103 may obtain, for example, a subset of linear distance along at least one axis, acceleration vector, magnetic vector and angular velocity vector to define position and orientation of the 3D scanning device 100. Temperature may also be recorded.

An initial position of the object 101 relative to the 3D scanning device 100 is obtained in step 206. To obtain this initial position of the object 101, light is generated and emitted by the light source 107 of the 3D scanning device 100. The object 101 should be placed within the path of the emitted light such that the emitted light hits the object 101 and is reflected thereby. The reflected light is picked up by the light receiving sensor 106 and is used to determine the distance between the object 101 and the 3D scanning device 100. The distance between the object 101 and the 3D scanning device 100 may be determined through a number of different techniques, some of which may be better suited to different working environments than others. For example, timing of the emission of a pulse of light from the light source 107 until the reflected light is detected by the light receiving sensor 106 may be used to determine the distance. If the light source 107 is a lidar style laser, then the light receiving sensor 106 may be calibrated to the light source 107 using a precisely timed laser emitter and receptor. The light source 107 may be fired at a defined target located at a known distance. When the light reflected by the target is received by the light receiving sensor 106, the distance between the target and the light receiving sensor 106 may be determined based on time of flight formulas. This process may be performed multiple times over a predefined time frame (days, weeks, etc) in an effort to define an accurate algorithmic process to better define outside influences on a trajectory of a beam from the light source 107 at any distance.

If very precise measurements are desired based on the light receiving sensor 106 and the light source 107, then triangulation or other techniques may be used to obtain the initial position of the object 101 relative to the 3D scanning device 100. For example, a triangulation laser may be used as the light source 107. In such a case, calibration may be performed by identifying a target in a controlled environment and placing the target at a specified distance from the light source 107 and the camera 105. The target may be located at both ends of a predefined laser field of view where measurements may be compared based on the identified measurements.

The initial position of the object 101 may also be determined, for example, by a radar sensor, a gauged micrometer, etc. For example, a focused ultrasonic sensor may be used in place of a triangulation laser sensor, the sensor measurement may be identified relative to the sensor array 103 location. Knowing where the ultrasonic sensor location is relative to the sensor array 103 location enables identification of each measurement with a 3D coordinate location.

For each data acquisition point of the 3D scanning device 100, the light source 107 may emit 1000-1500 points of light with each point of light being separated by approximately 0.001 mm from each other (either at a point of emission or a point at which the points of light impact the object depending on the light source 107). The light receiving sensor 106 receives each of these points of light when reflected by the object 101. The resulting measurements from the light receiving sensor 106 are stored as a set of light measurements. A distance between the object 101 and the 3D scanning device 100 may be determined for each of these points resulting in a set of distances or received light measurements for each data acquisition point of the 3D scanning device 100 during the data acquisition operation.

Initial image data is obtained by the camera 105 in step 208. The initial image data is combined with the initial position of the object 101 relative to the 3D scanning device 100 along with the set of received light measurements (or image profile data) to create a baseline position and orientation of the object 101 with respect to the 3D scanning device 100 in step 210. The set of received light measurements (or image profile data) is a string of measurements from the light receiving sensor 106 indicating a distance to the object 101.

The initial position and orientation of the 3D scanning device 100 may be stored in the memory 108. The baseline position and orientation of the object 101 with respect to the 3D scanning device 100 formed by the initial image data, the initial set of received light measurements, and the initial relative position of the object 101 may be tagged as having been obtained at a same time and may also all be stored in the memory 108. The set of received light measurements, image data and position and orientation data may be stored as a series of synchronized data files that specify time, date and sequential collection data. This data may be synchronized with a particular time frequency, for example, 1 hz, 10 hz, . . . , 100 khz) based on an application.

The memory 108 may be located within the 3D scanning device 100 or may be located separate therefrom. In a case where the memory 108 is located separate from the 3D scanning device 100, the transmission unit 109 may transmit this data to a separate computer for storage. A check may be performed to confirm that this data was received and stored correctly. This data may be stored in a database in the memory in a number of different formats, for example, a sequential file.

The 3D scanning device 100 is moved around the object 101 during the data acquisition operation 200 to obtain measurements and images of the object 101. The 3D scanning device 100 may be moved around the object 101 in a movement pattern determined by the operator. Alternatively, the 3D scanning device 100 may prompt the operator to move the 3D scanning device 100 in a particular pattern or motion around the object 101 or in a particular direction. Such movement prompts by the 3D scanning device 100 may be based on, for example, previous inputs by the operator indicating areas of interest on the object 101, as a result of movement tracking determining areas of the object 101 that are unscanned or only have a few data points collected after post-processing to collect additional sets of received light measurements to improve accuracy of models generated from the collected data, etc. The 3D scanning device 100 may prompt for movement and/or movement direction, for example, through prompts on the display 112 of the 3D scanning device 100, visual cues (e.g., strategically placed light indicators on the 3D scanning device 100), audio cues, etc.

As the 3D scanning device 100 is moved during the data acquisition operation 200, motion of the 3D scanning device 100 is tracked in 3D space in step 212 by sensor array 103.

Image data and position data for the object 101 are collected in step 214 while the 3D scanning device 100 is being moved. The image data is obtained by the camera 105 while the position data is obtained by the light source 107 and the light receiving sensor 106.

A coherent beam of light is emitted from the light source 107 and received by the light receiving sensor 106 while the 3D scanning device 100 is being moved. The coherent beam of light may be emitted either on a continuous basis or upon a triggering command either from an external source, from a user input or from a command from the control processor 110 based on a factor such as time or amount of movement of the 3D scanning device 100. The light source 107 may provide a line scan of the object, resulting in specific point measurements of the object's surface features based on the received reflected light at the light receiving sensor 106. The measurements of this received light at the light receiving sensor 106 are stored as set of light measurements for each data acquisition point.

While the 3D scanning device 100 is moved, the camera 105 is obtaining images of the object 101 in coordination with the coherent beam of light emitted from the light source 107 whose reflection off the object 101 is measured by the light receiving sensor 106.

The image data, the position data and the movement data are stored as synchronized data such that they are associated with each other in step 216. For example, the sets of light measurements and the camera images are tagged as having been acquired at a particular time such that they can be associated with each other for future use.

There is a determination in step 218 as to whether or not sufficient data for the position of the object has been acquired by the 3D scanning device 100. This may be based, for example, according to a total movement of the 3D scanning device 100, a number of measurements acquired, based on operator preference, etc.

The data acquisition operation 200 is completed in step 220 after sufficient data for the object has been acquired.

FIG. 3 illustrates a flow chart 300 of a three-dimensional model creation operation 300 based on results from the data acquisition operation 200. The three-dimensional model creation operation 300 may be performed entirely by the processor 104 or an external computer having a processor and obtaining measurements from the 3D scanning device 100 through the transmission unit 109. The three-dimensional model creation operation 300 may also be implemented by a combination of the 3D scanning device 100 and an external computer. Results of the three-dimensional model creation operation 300 may be displayed either on the display 112 of the 3D scanning device 100, a display of the external computer or some other display.

The set of light measurements and possibly the camera images of the object for each data acquisition point and movement data of the 3D scanning device 100 from the sensor array 103 obtained during the data acquisition operation 200 are acquired during the three-dimensional model creation operation 300 in step 302.

The measurements from the light receiving sensor 106, the sensor array 103 and the camera 105 are synchronized according to times at which these measurements were captured in step 304. That is, measurements from the light receiving sensor 106, the sensor array 103 and the camera 105 that were captured at the same time are synchronized together as together they form an indication of surface characteristics of a particular part of the object 101. This synchronization may require precise timing for synchronizing the various measurements together or there may be a margin of discrepancy based on various factors, such as, for example, a rate of movement of the 3D scanning device 100 during the data acquisition operation 200 where a faster rate of movement may indicate a smaller allowable margin of discrepancy.

Based on the measurements from the sensor array 103, a distance that the 3D scanning device 100 travels during the data acquisition operation and the resulting position and orientation of the 3D scanning device 100 are determined in step 306.

The position and orientation of the 3D scanning device 100 are determined based on movements from a previous position and orientation. For example, a position and orientation of the 3D scanning device 100 at a first data acquisition point after the initial position and orientation is determined by the movement of the 3D scanning device 100 from the initial position and orientation to the first data acquisition point. Likewise, the position and orientation at the second data acquisition point is determined based on the movement of the 3D scanning device 100 between the first data acquisition point and the second data acquisition point. The movement measurements from the sensor array 103 are synchronized in step 304 with the sets of light measurements to determine the movement measurements from the sensor array 103 at each of the data acquisition points. The change in orientation and displacement between consecutive data acquisition points is determined and then applied to a previous consecutive position and orientation to obtain a next position and orientation for the 3D scanning device 100.

The orientation measurement of the 3D scanning device 100 may be determined using measurement data from the sensor array 103, for example, such as measurements from a gyroscope and/or accelerometer. Vectoring data may include gyroscopic measurements obtained from the sensor array 103. Based on previously known measurements, the vectoring data may be interpolated and used to determine a direction of movement of the 3D scanning device 100. Each direction may be tracked through a series of accelerations acting on the 3D scanning device 100 travelling through 3D space.

Prior to deriving other measurements, the measurements obtained by the sensor array 103 may be processed to take into account any effects of gravity and/or noise. An expected gravity vector may be determined by applying a quaternion determined from orientation obtained by the sensor array 103 onto a vector (e.g., such as [0 0-1] corresponding to gravity units in units of g). Such an estimated gravity vector is subtracted from an accelerometer time series thus effecting gravity force removal from acceleration measurements.

Noise may be taken into account in measurements obtained by the sensor array 103 by characterizing the noise in the measurements based on a variance of a time series of values of a sensor in the sensor array 103 over a determined time period (e.g., 50 to 200 measurements). Such noise values may be input into a measurement uncertainty matrix of an Unscented Kalman Filter (UKF). Doing this causes the UKF to weigh individual sensor values according to noise of the individual sensors. Using the UKF assumes that the noise in the measurements is additive white Gaussian noise. For noise that is not Gaussian, the UKF may be replaced by a particle filter after characterizing the noise in a manner that is appropriate for non-Gaussian noise.

The position of the 3D scanning device 100 may be determined based on the measurements from the sensor array 103 that are used to determine movement, orientation and/or through other measurements from the sensor array 103. For example, when the direction of travel of the 3D scanning device 100 is based on a series of acceleration measurements, these acceleration measurements may be double-integrated to derive a displacement of the 3D scanning device 100 through 3D space. The position may also be determined using the linear displacement sensor 116 in the sensor array 103. The position may also be determined based on an alignment of consecutive received light measurements from the light receiving sensor 106 as set out below.

The difference between consecutive sets of received light measurements may be used as an error check on the position and orientation measurements from the 3D scanning device 100. Each set of received light measurements captures features on the surface of the object 101 at various scales. These features may be, for example, a curvature of the surface, scratches or imperfections on the surface of the object 101, etc. For example, if between two consecutive sets of received light measurements, the 3D scanning device 100 is moved by a small amount then the second set of received light measurements will look substantially similar to the first set of received light measurements but with all of the features captured by the light measurements being shifted by the same small amount as the small amount of movement of the 3D scanning device 100. A comparison of the two consecutive sets of received light measurements can be used to identify an amount of displacement of the 3D scanning device 100 between the two consecutive sets of received light measurements. A correlation function or a difference between two consecutive sets of light measurements will highlight a difference in position of any features on the surface of the object 101 that was scanned. Other techniques such as iterative closest point (ICP), etc, may also be used.

If in the comparison of two consecutive sets of received light measurements it appears that one set has a different scale than the other set, this provides an indication that the 3D scanning device 100 has moved in a direction that is substantially perpendicular to the surface of the object 101 that is being scanned. For example, if a second set of received light measurements contains features that are 5% smaller than the features of a first set of received light measurements, this indicates that the 3D scanning device 100 was moved away from the object 101 for the data acquisition point when the second set of received light measurements was obtained. A determination of differences of scale between consecutive sets of received light measurements can be used to identify how much closer or further away from the object 101 the 3D scanning device 100 was moved between the two data acquisition points of the two consecutive sets of received light measurements.

The position measurement may also be determined using a combination of different displacement measurements derived from different techniques. For example, different displacement measurements derived from different techniques may be combined using an Unscented Kalman Filter to derive a final position for a particular data acquisition point. For example, the identified amount of displacement from the difference of the two consecutive sets of received light measurements and the position and orientation measurements from the sensor array 103 may be combined using the Unscented Kalman Filter to derive a position and orientation measurement for the 3D scanning device 100 at the particular data acquisition point.

After the displacement between consecutive data acquisition points is determined using the above, the displacement is applied to the position and orientation of the 3D scanning device 100 at a previous data acquisition point to obtain the position and orientation of the 3D scanning device 100 at the next data acquisition point.

The individual position and orientation measurements of the object 101 relative to the initial position and orientation are determined in step 308. These individual position and orientation measurements are determined based on the synchronized measurements and data from step 304. The distance that the 3D scanning device 100 travels as well as vectoring data is used to identify a position and orientation of each received light measurement and camera image. The relationship of the object 101 to each synchronized position and orientation of the 3D scanning device 100 is determined.

Each set of received light measurements are obtained with respect to the 3D scanning device 100. The 3D scanning device 100 can be considered to define a floating coordinate reference system. As such, each set of received light measurements are obtained with respect to the floating coordinate reference system defined by the 3D scanning device 100. However, since the 3D scanning device 100 moves between each set of received light measurements, this results in each set of received light measurements being obtained with respect to coordinate reference systems that are different from each other. All sets of received light measurements must be translated so that they are all within the same coordinate system, a fixed coordinate system. The position and orientation of the 3D scanning device 100 and the displacement of the 3D scanning device 100 are used to determine a translation of the floating coordinate reference system of the 3D scanning device 100 from one data acquisition point to a subsequent data acquisition point. This translation may be applied to the set of received light measurements from the subsequent data acquisition point such that both sets of received light measurements can be placed in the same reference coordinate system.

An iterative closest point (ICP) of the two consecutive measurements from the light receiving sensor 106 may be performed to align the two consecutive sets of data from the two consecutive measurements. An ICP of the two consecutive measurements would produce an affine vector (rotation and translation) that corresponds to a rotation and translation combination required to align one of the two consecutive sets of data with the other. With one of the two consecutive sets of data rotated and translated to align with the other, the consecutive sets of data could be subtracted with a resulting difference being an error or deviation between the two consecutive sets of data.

Although the above discusses the use of ICP to align two consecutive sets of data, other methods such as correlation, minimum variance, minimum least square error, etc., may also be used.

With an individual position of the 3D scanning device 100 determined for a particular data acquisition point, the received light measurements at that particular data acquisition point can be positioned and oriented in 3D space.

All of the individual position and orientation measurements together form a representation of the entire object 101 based on the movement of the 3D scanning device 100.

Using a location at which each set of received light measurements is obtained, the received light measurements are aligned into a 3D space in step 310 whose frame of reference is the initial position and orientation measurement of the 3D scanning device.

The sensor array 103 may be physically located in a fixed orientation and location relative to the light source 107 and the light receiving sensor 106. This is a calibrated origin (datum point) from which the light measurements may be associated.

The measurements from the light receiving sensor 106 that are aligned in 3D space from step 310 are used to generate a 3D point cloud of the object in step 312. The 3D point cloud represents the surfaces and features of the object based on the sets of points on the surface of the object that have been measured. A three-dimensional Cartesian coordinate system and/or a spherical coordinate system may be used in the creation of the 3D point cloud.

A density of the 3D point cloud is determined by a speed of movement the 3D scanning device 100 during the data acquisition operation as well as a rate at which the 3D scanning device 100 obtains measurements. The speed of movement of the 3D scanning device 100 may be determined by a method of locomotion of the 3D scanning device 100 (e.g., human hand, robotic arm, etc.) The rate at which the 3D scanning device 100 obtains measurements may be fixed at a time of the data acquisition operation but can be modified by the operator prior to the data acquisition operation. Motion of the 3D scanning device 100 may be monitored, for example, by means of visual feedback on a display provided to the operator during the data acquisition operation.

Accuracy of the 3D point cloud is analyzed in step 314. Accuracy of location of the points in the 3D point cloud may initially be determined by an accuracy of the sensor array 103 and an accuracy of the light source 107 and the light receiving sensor 106. The accuracy of the 3D point cloud may be determined, for example, by ground truth measurements based on geometry and landmarks of a subject used during calibration of the 3D scanning device 100. The accuracy of each individual point cloud may be based on the accuracy of the 3D scanning system 100 according to cumulative accuracies of the various components that form the 3D scanning device 100.

The accuracy of the 3D point cloud may also be determined by performing part of the data acquisition operation on the object again but with the 3D scanning device 100 oriented at 90 degrees from the orientation of the original data acquisition operation. This would produce two different 3D point clouds representing a same surface of at least part of the object that were acquired at different orientations of the 3D scanning device 100. The acquisition of the second set position data of the surface of the object may be acquired immediately after data was acquired for the surface with the different orientation for the 3D scanning device 100 or this second set of position data may be acquired at some other point in time. The two different 3D point clouds may be aligned using iterative closest point (ICP) to determine the accuracy of the 3D point clouds. This would also enable any problems in accuracy to be corrected.

The 3D scanning device 100 may be factory calibrated to determine and factor any possible offset between measurement devices in the 3D scanning device 100 (i.e., light receiving sensor 106, sensor array 103, etc.). The 3D scanning device 100 may be calibrated based on results of comparative data correlation of a precisely machined object used specifically for the calibration process.

The 3D point cloud may be revised in step 316 based on the accuracy determined in step 310 in order to improve this accuracy. In order to improve the accuracy of the 3D point cloud, specific features of the object may be recognized and verified and calculations and filters applied to the 3D point cloud. Calculations and filters employing profile recognition may be used to allow the point cloud to be analyzed from different angles of incidence. This may allow a determination of lines of best fit and may cancel out any potential discrepancies from one point to another collected at the same data acquisition point. The filters may locate areas of cross-over based initially on their location in three-dimensional space as estimated using the data from the sensor array 103. The surrounding cloud data may be aligned and a determination may be made by a combination of vectoring and profile lie if there are any erroneous or mismatched cloud points. For example, Kalman filtering may be used to generate the 3D model from the 3D point cloud. A customized Kalman filtering may also be used to filer out the high and low pass artifacts. Additionally, a version of Iterative Closest Point (ICP) may be used to identify location data for each profile point. This may produce a 3D model with increased accuracy and limited impacts of natural cross-track drift from the sensor array 103 as well as high and low path noise.

In the embodiment outlined above in which there are two different 3D point clouds that are generated from data acquisition operations that are performed at different times with the 3D scanning device 100 being oriented at 90 degrees during one of the data acquisition operations, the determined error or deviation determined in step 314 can be used to track and eliminate any shift or displacement with the 3D point cloud.

The 3D point cloud is used in step 318 to generate a 3D model representing the object 101. For example, Delaunay triangulation, alpha shapes and ball pivoting, may be used to build a network of polygons (e.g., triangles, quads, etc.) over the points in the 3D points cloud in order to form a mesh that may be smoothed to extrapolate the 3D model. Alternatively, the 3D point cloud may be converted into a volumetric distance field comprised of voxels which can be used to reconstruct surfaces through a marching cubes algorithm in order to generate the 3D model. Further, the generated 3D point cloud may be provided to a 3D drafting system for integration into a design or data library or for other purposes.

The images from the camera 105 are used in step 320 to verify specifics about the surface of the object to revise the 3D model. For example, texture, colour and reflectivity of the surface of the object may be determined from the images using the camera 105. These characteristics may then be used to revise the 3D model to more accurately reflect the object. Using the related image captured by the camera 105, surfaces of the object 101 may be detected and assigned an indicator. The indicator may be assigned to the corresponding surface of the 3D model to identify different profile elevations.

The 3D model resulting from the 3D model creation operation 300 may be used in a variety of settings given that it provides an accurate electronic depiction of the object. For example, the 3D model can be used to compare and verify dimensional conformance based on a comparison of the 3D model generated from the object with a 3D model (or other such dimensional representations of the surface of the object) generated prior to manufacturing of the object. A comparison can be made to ensure that the manufactured object, or an object that has been in use and is being assessed for wear, falls within determined dimensional difference limitations.

While the present techniques may be susceptible to various modifications and alternative forms, the embodiments discussed above have been shown only by way of example. However, it should again be understood that the techniques are not intended to be limited to particular embodiments disclosed herein. Indeed, the present techniques include all alternatives, modifications and equivalents falling within the scope hereof

The invention claimed is:

1. A three-dimensional scanning device comprising:
   a light source configured to produce a coherent beam of light that is emitted towards an object, the coherent beam of light being reflected by the object;
   a light receiving sensor configured to receive and measure the reflected coherent beam of light reflected by the object, the received reflected coherent beam of light forming a set of light measurements;
   a sensor array configured to track the three-dimensional scanning device in three-dimensional space in real-time, the sensor array comprising an inertial measuring unit for measuring and tracking movement and acceleration of the three-dimensional scanning device and a linear distance sensor for measuring linear distance with respect to a fixed anchor point that is external to the three-dimensional scanning device;
   a memory in which data representing the set of light measurements at each of a plurality of data acquisition points from the light receiving sensor and data representing measurements of the movement, the acceleration and the linear displacement of the three-dimensional scanning device from the sensor array are stored; and
   a processor configured to:
      measure, at the sensor array, the movement, the acceleration and the linear displacement of the three-dimensional scanning device during the movement of the three-dimensional scanning device to provide the data representing the movement, the acceleration and the linear displacement of the three-dimensional scanning device;
      measure, at the light receiving sensor at the plurality of data acquisition points, the received reflected coherent beam of light reflected by the object to produce the data representing the set of light measurements at each of the plurality of data acquisition points, the plurality of data acquisition points occurring during the movement of the three-dimensional scanning device;
      synchronize, from the memory at the plurality of data acquisition points, the data representing the movement, the acceleration and the linear displacement of the three-dimensional scanning device with the data representing the set of light measurements to generate a synchronized data set for each of the plurality of data acquisition points, wherein each synchronized data set comprises a position and orientation of the three-dimensional scanning device based on the data representing the movement, the acceleration and the linear distance and a synchronized set of light measurements;
      perform an error correction to the position and orientation of the three-dimensional scanning device in each of the synchronized data sets based on consecutive sets of the set of light measurements for each of the plurality of data acquisition points and the linear displacement; and
      generate a three-dimensional representation of the object based on the synchronized data set for the plurality of data acquisition points.

2. The three-dimensional scanning device of claim 1, wherein the light source comprises at least one of a diode, a laser and a light emitting diode, and wherein the coherent beam of light comprises one of multiple beams of light selected from beams configured in a dot pattern, a line scan and a beam that moves in a pattern at each of the plurality of data acquisition points.

3. The three-dimensional scanning device of claim 1, further comprising a camera configured to obtain an image of the object at each of the plurality of data acquisition points.

4. The three-dimensional scanning device of claim 1, further comprising a transmission unit interfacing with a computer system to transmit the data representing the set of light measurements for each of the plurality of data acquisition points and the data representing the measurements of the movement, the acceleration and the linear displacement of the three-dimensional scanning device thereto.

5. The three-dimensional scanning device of claim 1, wherein the three-dimensional scanning device comprises at least one handheld device which may be configured for use in an external frame system.

6. The three-dimensional scanning device of claim 1, wherein the sensor array further comprises at least one component chosen from at least one accelerometer, at least one gyroscope, at least one magnetometer, a Global Positioning System module, and a Global Navigation Satellite System module.

7. The three-dimensional scanning device of claim 1, wherein the inertial measurement unit measures the movement of the three-dimensional scanning device by measuring in one or more axes of movement one or more of linear displacement, axis velocity, linear acceleration, orientation and vector data.

8. The three-dimensional scanning device of claim 1, wherein the linear distance sensor comprises a plurality of linear distance sensors positioned around the three-dimensional scanning device.

9. The three-dimensional scanning device of claim 1, wherein synchronize comprises:
   determine the position and orientation of the three-dimensional scanning device at each of the plurality of data acquisition points based on the measurements of the movement, the acceleration and the linear displacement;
   wherein determine the position and orientation of the three-dimensional scanning device comprises:
   determine an initial position and orientation of the three-dimensional scanning device based on measurements from the sensor array at a first of the plurality of data acquisition points;
   determine a position and orientation of the three-dimensional scanning device for each subsequent one of the plurality of data acquisition points based on a displacement from a previous consecutive one of the plurality of data acquisition points to the subsequent one of the plurality of data acquisition points, comprising:
  determine the displacement of the three-dimensional scanning device from the previous consecutive one of the plurality of data acquisition points to the subsequent one of the plurality of data acquisition points by one of:
    deriving the displacement based on the acceleration between the previous consecutive one of the plurality of data acquisition points and the subsequent one of the plurality of data acquisition points;
    deriving the displacement based on a difference in the linear displacement between the previous consecutive one of the plurality of data acquisition points and the subsequent one of the plurality of data acquisition points; and
    deriving the displacement based on an alignment of the set of light measurements at the previous consecutive one of the plurality of data acquisition points with the set of light measurements at the subsequent one of the plurality of data acquisition points; and
  apply the displacement to a position and orientation of the three-dimensional scanning device at the previous consecutive one of the plurality of data acquisition points to obtain the position and orientation of the three-dimensional scanning device at the subsequent one of the plurality of data acquisition points.

10. The three-dimensional scanning device of claim 9, wherein deriving the displacement based on the alignment comprises:
  determine a difference in position and orientation of identifiable features on the object by comparing the set of light measurements at the previous consecutive one of the plurality of data acquisition points with the set of light measurements at the subsequent one of the plurality of data acquisition points, the difference being considered to be representative of the displacement of the three-dimensional scanning device from the previous consecutive one of the plurality of data acquisition points to the subsequent one of the plurality of data acquisition points.

11. The three-dimensional scanning device of claim 1, wherein synchronize comprises:
  determine the position and orientation of the three-dimensional scanning device at each of the plurality of data acquisition points based on the measurements of the movement, the acceleration and the linear displacement;
  wherein determine the position and orientation of the three-dimensional scanning device comprises
  determine an initial position and orientation of the three-dimensional scanning device based on measurements from the sensor array at a first of the plurality of data acquisition points;
  determine a position and orientation of the three-dimensional scanning device for each subsequent one of the plurality of data acquisition points based on a displacement from a previous consecutive one of the plurality of data acquisition points to the subsequent one of the plurality of data acquisition points, comprising:
    determine the displacement of the three-dimensional scanning device from the previous consecutive one of the plurality of data acquisition points to the subsequent one of the plurality of data acquisition points by:
      deriving a first displacement based on the acceleration between the previous consecutive one of the plurality of data acquisition points and the subsequent one of the plurality of data acquisition points;
      deriving a second displacement based on a difference in the linear displacement between the previous consecutive one of the plurality of data acquisition points and the subsequent one of the plurality of data acquisition points;
      deriving a third displacement based on an alignment of the set of light measurements at the previous consecutive one of the plurality of data acquisition points with the set of light measurements at the subsequent one of the plurality of data acquisition points; and
      combining the first displacement, the second displacement and the third displacement to provide the displacement of the three-dimensional scanning device; and
    apply the displacement to a position and orientation of the three-dimensional scanning device at the previous consecutive one of the plurality of data acquisition points to obtain the position and orientation of the three-dimensional scanning device at the subsequent one of the plurality of data acquisition points.

12. The three-dimensional scanning device of claim 1, wherein synchronize comprises:
  determine an initial position and orientation of the object based on the set of light measurements at a first of the plurality of data acquisition points;
  determine a position and orientation of the object for each subsequent one of the plurality of data acquisition points based on a difference between the set of light measurements from a previous consecutive one of the plurality of data acquisition points and between the set of light measurements at the subsequent one of the plurality of data acquisition points,
  wherein determine the position and orientation of the object at each subsequent one of the plurality of data acquisition points comprises:
    compare the set of light measurements at the previous consecutive one of the plurality of data acquisition points with the set of light measurements at the subsequent one of the plurality of data acquisition points;
    determine a translational and rotational difference between the set of light measurements at the previous consecutive one of the plurality of data acquisition points and the set of light measurements at the subsequent one of the plurality of data acquisition points based on the comparison; and
    apply the translation and rotation difference to the set of light measurements at the subsequent one of the plurality of data acquisition points to obtain the position and orientation of the object at the subsequent one of the plurality of data acquisition points.

13. The three-dimensional scanning device of claim 1, wherein generate the three-dimensional representation comprises:
  align a position and orientation of the object at each of the plurality of data acquisition points in three-dimensional space;

generate a three-dimensional point cloud from the aligned position and orientation of the object; and
generate a three-dimensional model from the three-dimensional point cloud.

14. A three-dimensional scanning system comprising:
a three-dimensional scanning device comprising:
  a light source configured to produce a coherent beam of light that is emitted towards an object, the coherent beam of light being reflected by the object;
  a light receiving sensor configured to receive and measure the reflected coherent beam of light reflected by the object, the received reflected coherent beam of light forming a set of light measurements;
  a sensor array configured to track the three-dimensional scanning device in three-dimensional space in real-time, the sensor array comprising an inertial measuring unit for measuring and tracking movement and acceleration of the three-dimensional scanning device and a linear distance sensor for measuring a linear distance with respect to a fixed anchor point that is external to the three-dimensional scanning device;
  a transmission unit for transmitting data representing the set of light measurements from the light receiving sensor for each of a plurality of data acquisition points occurring during the movement of the three-dimensional scanning device and data representing measurements of the movement, the acceleration and the linear displacement of the three-dimensional scanning device from the sensor array; and a computer comprising:
    an interface for receiving the data representing the set of light measurements for each of the plurality of data acquisition points from the light receiving sensor and the data representing measurements of the movement, the acceleration and the linear displacement of the three-dimensional scanning device from the sensor array;
    a processor configured to:
      determine a position and orientation of the three-dimensional scanning device at each of the plurality of data acquisition points based on the movement, the acceleration and the linear displacement measured by the sensor array;
      determine an initial position and orientation of the object based on the set of light measurements at a first of the plurality of data acquisition points;
      determine a position and orientation of the object for each subsequent one of the plurality of data acquisition points based on a difference between the set of light measurements from a previous consecutive one of the plurality of data acquisition points and between the set of light measurements at the subsequent one of the plurality of data acquisition points;
      perform an error correction to the position and orientation of the three-dimensional scanning device at each of the plurality of data acquisition points based consecutive sets of the set of light measurements for each of the plurality of data acquisition points and the linear displacement; and
      generate a three-dimensional representation of the object based on the position and orientation of the three-dimensional scanning device and the position and orientation of the object at the plurality of data acquisition points.

15. The three-dimensional scanning device of claim 14, wherein the light source comprises at least one of a diode, a laser and a light emitting diode and wherein the coherent beam of light comprises one of multiple beams of light selected from beams configured in a dot pattern, a line scan and a beam that moves in a pattern at each of the plurality of data acquisition points.

16. The three-dimensional scanning device of claim 14, further comprising a camera configured to obtain an image of the object at each of the plurality of data acquisition points.

17. The three-dimensional scanning device of claim 14, wherein the three-dimensional scanning device comprises at least one of a handheld device which may be configured for use in an external frame system.

18. The three-dimensional scanning device of claim 14, wherein the sensor array further comprises at least one component chosen from at least one accelerometer, at least one gyroscope, at least one magnetometer, a Global Positioning System module, and a Global Navigation Satellite System module.

19. The three-dimensional scanning device of claim 14, wherein the inertial measuring unit measures the movement of the three-dimensional scanning device by measuring in one or more axes of movement one or more of linear displacement, axis velocity, linear acceleration, orientation and vector data.

20. The three-dimensional scanning device of claim 14, wherein the linear distance sensor comprises a plurality of linear distance sensors positioned around the three-dimensional scanning device.

21. The three-dimensional scanning device of claim 14, wherein determine the position and orientation of the three-dimensional scanning device comprises:
  determine an initial position and orientation of the three-dimensional scanning device based on measurements from the sensor array at a first of the plurality of data acquisition points;
  determine a position and orientation of the three-dimensional scanning device for each subsequent one of the plurality of data acquisition points based on a displacement from a previous consecutive one of the plurality of data acquisition points to the subsequent one of the plurality of data acquisition points, comprising:
    determine the displacement of the three-dimensional scanning device from the previous consecutive one of the plurality of data acquisition points to the subsequent one of the plurality of data acquisition points by one of:
      deriving the displacement based on the acceleration between the previous consecutive one of the plurality of data acquisition points and the subsequent one of the plurality of data acquisition points;
      deriving the displacement based on a difference in the linear displacement between the previous consecutive one of the plurality of data acquisition points and the subsequent one of the plurality of data acquisition points; and
      deriving the displacement based on an alignment of the set of light measurements at the previous consecutive one of the plurality of data acquisition points with the set of light measurements at the subsequent one of the plurality of data acquisition points; and apply the displacement to a position and orientation of the three-dimensional scanning device at the previous consecutive one of the plurality of data acquisition points to obtain the position and orientation of the three-dimensional scanning device at the subsequent one of the plurality of data acquisition points.

22. The three-dimensional scanning device of claim 21, wherein deriving the displacement based on an alignment comprises:
   determine a difference in position and orientation of identifiable features on the object by comparing the set of light measurements at the previous consecutive one of the plurality of data acquisition points with the set of light measurements at the subsequent one of the plurality of data acquisition points, the difference being considered to be representative of the displacement of the three-dimensional scanning device from the previous consecutive one of the plurality of data acquisition points to the subsequent one of the plurality of data acquisition points.

23. The three-dimensional scanning device of claim 14, wherein determine the position and orientation of the three-dimensional scanning device comprises:
   determine an initial position and orientation of the three-dimensional scanning device based on measurements from the sensor array at a first of the plurality of data acquisition points;
   determine a position and orientation of the three-dimensional scanning device for each subsequent one of the plurality of data acquisition points based on a displacement from a previous consecutive one of the plurality of data acquisition points to the subsequent one of the plurality of data acquisition points, comprising:
      determine the displacement of the three-dimensional scanning device from the previous consecutive one of the plurality of data acquisition points to the subsequent one of the plurality of data acquisition points by:
         deriving a first displacement based on the acceleration between the previous consecutive one of the plurality of data acquisition points and the subsequent one of the plurality of data acquisition points;
         deriving a second displacement based on a difference in the linear displacement between the previous consecutive one of the plurality of data acquisition points and the subsequent one of the plurality of data acquisition points;
         deriving a third displacement based on an alignment of the set of light measurements at the previous consecutive one of the plurality of data acquisition points with the set of light measurements at the subsequent one of the plurality of data acquisition points; and
         combining the first displacement, the second displacement and the third displacement to provide the displacement of the three-dimensional scanning device; and
   apply the displacement to a position and orientation of the three-dimensional scanning device at the previous consecutive one of the plurality of data acquisition points to obtain the position and orientation of the three-dimensional scanning device at the subsequent one of the plurality of data acquisition points.

24. The three-dimensional scanning device of claim 14, wherein determine the position and orientation of the object at each subsequent one of the plurality of data acquisition points comprises:
   compare the set of light measurements at the previous consecutive one of the plurality of data acquisition points with the set of light measurements at the subsequent one of the plurality of data acquisition points;
   determine a translational and rotational difference between the set of light measurements at the previous consecutive one of the plurality of data acquisition points and the set of light measurements at the subsequent one of the plurality of data acquisition points based on the comparison; and
   apply the translation and rotation difference to the set of light measurements at the subsequent one of the plurality of data acquisition points to obtain the position and orientation of the object at the subsequent one of the plurality of data acquisition points.

25. The three-dimensional scanning device of claim 14, wherein generate the three-dimensional representation comprises:
   align a position and orientation of the object at each of the plurality of data acquisition points in three-dimensional space;
   generate a three-dimensional point cloud from the aligned position and orientation of the object; and
   generate a three-dimensional model from the three-dimensional point cloud.

26. A method of performing a three-dimensional scan of an object comprising:
   obtaining sets of measurements representing a surface of the object, each of the sets of measurements corresponding to one of a plurality of data acquisition points and being produced when a beam from a three-dimensional scanning device is reflected by the surface of the object at the one of the plurality of data acquisition points, the plurality of data acquisition points occurring during movement of the three-dimensional scanning device;
   obtaining an initial position and orientation of the object with respect to the three-dimensional scanning device based on a set of measurements at a first of the plurality of data acquisition points;
   measuring movement and acceleration of the three-dimensional scanning device by tracking three-dimensional movement and linear displacement with respect to a fixed anchor point that is external to the three-dimensional scanning device by a sensor array of the three-dimensional scanning device;
   determining a position and orientation of the three-dimensional scanning device at each of the plurality of data acquisition points based on the movement, the acceleration and the linear displacement;
   determining a position and orientation of the object for each subsequent one of the plurality of data acquisition points based on a difference between the set of measurements from a previous consecutive one of the plurality of data acquisition points and the set of measurements at the subsequent one of the plurality of data acquisition points;
   performing an error correction of the position and orientation of the three-dimensional scanning device at each of the plurality of data acquisition points based consecutive sets of the set of measurements for each of the plurality of data acquisition points and the linear displacement; and generating a three-dimensional representation of the object based on the position and orientation of the three-dimensional scanning device and the position and orientation of the object at the plurality of data acquisition points.

27. The method of claim 26, wherein measuring the movement and the acceleration of the three-dimensional scanning device comprises:
measuring the movement of the three-dimensional scanning device using one or more of an inertial measuring unit, at least one linear distance sensor, at least accelerometer, at least one gyroscope, at least one magnetometer, a Global Positioning System module, and a Global Navigation Satellite System module.

28. The method of claim 26, wherein determining the position and orientation of the three-dimensional scanning device at each of the plurality of data acquisition points comprises:
determining an initial position and orientation of the three-dimensional scanning device based on measurements from the sensor array at the first of the plurality of data acquisition points;
determining the position of the three-dimensional scanning device for each subsequent one of the plurality of data acquisition points based on a displacement from a previous consecutive one of the plurality of data acquisition points to the subsequent one of the plurality of data acquisition points, comprising:
determining the displacement of the three-dimensional scanning device from the previous consecutive one of the plurality of data acquisition points to the subsequent one of the plurality of data acquisition points by one of:
deriving the displacement based on the acceleration between the previous consecutive one of the plurality of data acquisition points and the subsequent one of the plurality of data acquisition points;
deriving the displacement based on a difference in the linear displacement between the previous consecutive one of the plurality of data acquisition points and the subsequent one of the plurality of data acquisition points; and
deriving the displacement based on an alignment of the set of measurements at the previous consecutive one of the plurality of data acquisition points with the set of measurements at the subsequent one of the plurality of data acquisition points; and
applying the displacement to a position and orientation of the three-dimensional scanning device at the previous consecutive one of the plurality of data acquisition points to obtain the position and orientation of the three-dimensional scanning device at the subsequent one of the plurality of data acquisition points.

29. The method of claim 28, wherein deriving the displacement based on an alignment comprises:
determining a difference in position and orientation of identifiable features on the object by comparing the set of measurements at the previous consecutive one of the plurality of data acquisition points with the set of measurements at the subsequent one of the plurality of data acquisition points, the difference being considered to be representative of the displacement of the three-dimensional scanning device from the previous consecutive one of the plurality of data acquisition points to the subsequent one of the plurality of data acquisition points.

30. The method of claim 26, wherein determining the position and orientation of the three-dimensional scanning device at each of the plurality of data acquisition points comprises:
determining an initial position and orientation of the three-dimensional scanning device based on measurements from the sensor array at the first of the plurality of data acquisition points;
determining a position and orientation of the three-dimensional scanning device for each subsequent one of the plurality of data acquisition points based on a displacement from a previous consecutive one of the plurality of data acquisition points to the subsequent one of the plurality of data acquisition points, comprising:
determining the displacement of the three-dimensional scanning device from the previous consecutive one of the plurality of data acquisition points to the subsequent one of the plurality of data acquisition points by:
deriving a first displacement based on the acceleration between the previous consecutive one of the plurality of data acquisition points and the subsequent one of the plurality of data acquisition points;
deriving a second displacement based on a difference in the linear displacement between the previous consecutive one of the plurality of data acquisition points and the subsequent one of the plurality of data acquisition points;
deriving a third displacement based on an alignment of the set of measurements at the previous consecutive one of the plurality of data acquisition points with the set of measurements at the subsequent one of the plurality of data acquisition points; and
combining the first displacement, the second displacement and the third displacement to provide the displacement of the three-dimensional scanning device; and
applying the displacement to a position and orientation of the three-dimensional scanning device at the previous consecutive one of the plurality of data acquisition points to obtain the position and orientation of the three-dimensional scanning device at the subsequent one of the plurality of data acquisition points.

31. The method of claim 30, wherein determining the position and orientation of the object at each subsequent one of the plurality of data acquisition points comprises:
comparing the set of measurements at the previous consecutive one of the plurality of data acquisition points with the set of measurements at the subsequent one of the plurality of data acquisition points;
determining a translational and rotational difference between the set of measurements at the previous consecutive one of the plurality of data acquisition points and the set of measurements at the subsequent one of the plurality of data acquisition points based on the comparison; and
applying the translation and rotation difference to the set of measurements at the subsequent one of the plurality of data acquisition points to obtain the position and orientation of the object at the subsequent one of the plurality of data acquisition points.

32. The method of claim 26, wherein generating the three-dimensional representation comprises:

aligning a position and orientation of the object at each of the plurality of data acquisition points in three-dimensional space;
generating a three-dimensional point cloud from the aligned position and orientation of the object; and
generating a three-dimensional model from the three-dimensional point cloud.

33. The three-dimensional scanning device of claim 1, wherein perform the error correction comprises:
identify at least two features on a surface of the object based on the set of the light measurements at one of the plurality of data acquisition points;
obtain the set of the light measurements at a consecutive one of the plurality of data acquisition points from the one of the plurality of data acquisition points;
determine a displacement of each of the at least two features between the one of the plurality of data acquisition points and the consecutive one of the plurality of data acquisition points;
compare the displacement of each of the at least two features to identify a difference in the displacements of each of the at least two features; and
determine an error correction for the position and orientation of the three-dimensional scanning device based on the comparison of the displacements of the at least two features.

34. The three-dimensional scanning device of claim 1, wherein perform the error correction comprises:
determine a difference between the position and orientation of the three-dimensional scanning device from two synchronized data sets at two consecutive points from the plurality of data acquisition points based on the movement and the acceleration to obtain a first displacement of the three-dimensional scanning device;
determine a second displacement of the three-dimensional scanning device corresponding to the linear displacement from the two synchronized data sets at the two consecutive points from the plurality of data acquisition points;
compare the first displacement and the second displacement to obtain an error in the position and orientation of the three-dimensional scanning device at one of the two consecutive points from the plurality of data acquisition points; and
determine the error correction for the position and orientation of the three-dimensional scanning device at the one of the two consecutive points from the plurality of data acquisition points based on the comparison of the first displacement and the second displacement.

35. The three-dimensional scanning system of claim 14, wherein perform the error correction comprises:
identify at least two features on a surface of the object based on the set of the light measurements at one of the plurality of data acquisition points;
obtain the set of the light measurements at a consecutive one of the plurality of data acquisition points from the one of the plurality of data acquisition points;
determine a displacement of each of the at least two features between the one of the plurality of data acquisition points and the consecutive one of the plurality of data acquisition points;
compare the displacement of each of the at least two features to identify a difference in the displacements of each of the at least two features; and
determine an error correction for the position and orientation of the three-dimensional scanning device based on the comparison of the displacements of the at least two features.

36. The three-dimensional scanning system of 26, wherein perform the error correction comprises:
determine a difference between the position and orientation of the three-dimensional scanning device from two synchronized data sets at two consecutive points from the plurality of data acquisition points based on the movement and the acceleration to obtain a first displacement of the three-dimensional scanning device;
determine a second displacement of the three-dimensional scanning device corresponding to the linear displacement from the two synchronized data sets at the two consecutive points from the plurality of data acquisition points;
compare the first displacement and the second displacement to obtain an error in the position and orientation of the three-dimensional scanning device at one of the two consecutive points from the plurality of data acquisition points; and
determine the error correction for the position and orientation of the three-dimensional scanning device at the one of the two consecutive points from the plurality of data acquisition points based on the comparison of the first displacement and the second displacement.

37. The method of claim 26, wherein performing the error correction comprises:
identifying at least two features on the surface of the object based on the set of the measurements at one of the plurality of data acquisition points;
obtaining the set of measurements at a consecutive one of the plurality of data acquisition points from the one of the plurality of data acquisition points;
determining a displacement of each of the at least two features between the one of the plurality of data acquisition points and the consecutive one of the plurality of data acquisition points;
comparing the displacement of each of the at least two features to identify a difference in the displacements of each of the at least two features; and
determining an error correction for the position and orientation of the three-dimensional scanning device based on the comparison of the displacements of the at least two features.

38. The method of claim 26, wherein performing the error correction comprises:
determining a difference between the position and orientation of the three-dimensional scanning device from two synchronized data sets at two consecutive points from the plurality of data acquisition points based on the movement and the acceleration to obtain a first displacement of the three-dimensional scanning device;
determining a second displacement of the three-dimensional scanning device corresponding to the linear displacement from the two synchronized data sets at the two consecutive points from the plurality of data acquisition points;
comparing the first displacement and the second displacement to obtain an error in the position and orientation of the three-dimensional scanning device at one of the two consecutive points from the plurality of data acquisition points; and
determining the error correction for the position and orientation of the three-dimensional scanning device at the one of the two consecutive points from the plurality of data acquisition points based on the comparison of the first displacement and the second displacement.

* * * * *